United States Patent [19]

Hudson et al.

[11] Patent Number: 6,077,890
[45] Date of Patent: Jun. 20, 2000

[54] STABILIZER FORMULATION FOR THERMOPLASTIC POLYMERS

[75] Inventors: Robert L. Hudson; Mary Lou Delucia, both of Roswell, Ga.

[73] Assignee: Kimberly-Clark Worldwide, Inc., Neenah, Wis.

[21] Appl. No.: 08/985,336

[22] Filed: Dec. 4, 1997

[51] Int. Cl.[7] .............................. C08K 5/34; C08K 5/51; C08K 5/17; C08K 5/04
[52] U.S. Cl. .......................... 524/100; 524/148; 524/153; 524/236; 524/400
[58] Field of Search .................................. 524/100, 148, 524/153, 236, 400

[56] References Cited

U.S. PATENT DOCUMENTS

| | | |
|---|---|---|
| 4,302,383 | 11/1981 | Valdiserri et al. . |
| 4,366,280 | 12/1982 | Yukawa . |
| 4,371,651 | 2/1983 | Leistner et al. . |
| 4,415,686 | 11/1983 | Chasar . |
| 4,425,464 | 1/1984 | Allen et al. . |
| 4,590,231 | 5/1986 | Seltzer et al. . |
| 4,612,393 | 9/1986 | Ravichandran et al. . |
| 4,668,721 | 5/1987 | Seltzer et al. . |
| 4,668,727 | 5/1987 | Ravichandran et al. . |
| 4,673,700 | 6/1987 | Ravichandran et al. . |
| 4,691,015 | 9/1987 | Behrens et al. . |
| 4,703,073 | 10/1987 | Winter et al. . |
| 4,717,748 | 1/1988 | Ravichandran et al. . |
| 4,739,000 | 4/1988 | Burton . |
| 4,774,275 | 9/1988 | Hisano et al. . |
| 4,857,230 | 8/1989 | Matsumura . |
| 4,876,300 | 10/1989 | Seltzer et al. . |
| 4,929,654 | 5/1990 | Wang et al. . |
| 4,960,593 | 10/1990 | Sevini et al. . |
| 4,965,301 | 10/1990 | Leininger . |
| 4,972,009 | 11/1990 | Suhadolnik et al. . |
| 5,015,679 | 5/1991 | Matamura . |
| 5,021,480 | 6/1991 | Ravichandran . |
| 5,023,283 | 6/1991 | Ravichandran et al. . |
| 5,039,723 | 8/1991 | Haruna et al. . |
| 5,045,577 | 9/1991 | Mülhaupt et al. . |
| 5,045,583 | 9/1991 | Odorisio et al. . |
| 5,055,507 | 10/1991 | Haruna et al. . |
| 5,063,264 | 11/1991 | Nakajima . |
| 5,081,170 | 1/1992 | Yagi et al. . |
| 5,096,950 | 3/1992 | Galbo et al. . |
| 5,202,441 | 4/1993 | Suhadolnik et al. . |
| 5,227,418 | 7/1993 | Mueller, Jr. et al. . |
| 5,292,785 | 3/1994 | Pastor et al. . |
| 5,310,771 | 5/1994 | Walters . |
| 5,350,786 | 9/1994 | Costanzi et al. . |
| 5,371,125 | 12/1994 | Cunkle et al. . |
| 5,393,812 | 2/1995 | Haley et al. . |
| 5,395,869 | 3/1995 | Kawamoto et al. . |
| 5,397,820 | 3/1995 | Wright . |
| 5,401,797 | 3/1995 | Kotani et al. . |
| 5,410,047 | 4/1995 | Suhadolnik et al. . |
| 5,414,034 | 5/1995 | Enlow et al. . |
| 5,455,289 | 10/1995 | Caselli . |
| 5,457,143 | 10/1995 | Scrima et al. . |
| 5,468,437 | 11/1995 | Hall . |
| 5,473,001 | 12/1995 | Myers . |
| 5,500,467 | 3/1996 | Mahood . |
| 5,510,404 | 4/1996 | Nakae et al. . |
| 5,529,845 | 6/1996 | Branchesi et al. . |
| 5,543,102 | 8/1996 | Mahood . |
| 5,552,464 | 9/1996 | Suhadolnik et al. . |
| 5,574,082 | 11/1996 | Keller et al. . |
| 5,596,033 | 1/1997 | Horsey et al. . |
| 5,614,571 | 3/1997 | Mahood . |
| 5,623,009 | 4/1997 | Mahood . |
| 5,654,430 | 8/1997 | Pitteloud . |
| 5,668,198 | 9/1997 | Suhadolnik et al. . |
| 5,668,199 | 9/1997 | Suhadolnik et al. . |

*Primary Examiner*—Kriellion Sanders
*Attorney, Agent, or Firm*—Dority & Manning, P.A.

[57] ABSTRACT

A stabilizer formulation particularly well suited for improving the properties of thermoplastic polymers is disclosed. The stabilizer formulation contains a combination of stabilizers that improves the process stability of a polymer, prevents the polymer from yellowing, increases the thermal aging stability of the polymer and inhibits the polymer from generating smoke during melt processing. Of particular advantage, the stabilizer formulation improves the stability of a polymer without significantly adversely affecting any other properties of the polymer. In one embodiment, the stabilizer formulation includes a hindered amine, a hydroxyl amine, and one or more hydrolytically resistant phosphites. In one embodiment, the formulation can further contain an acid scavenger for preventing an acid contained within the polymer or produced during processing from harming the polymer.

25 Claims, No Drawings

STABILIZER FORMULATION FOR THERMOPLASTIC POLYMERS

FIELD OF THE INVENTION

The present invention generally relates to a stabilizer formulation for thermoplastic polymers that improves the properties of the polymers during melt processing. More particularly, the present invention is directed to incorporating into a polymer, such as polypropylene, a combination of stabilizers that provides the polymer with process stability, low yellowing, an increase in thermal aging stability, and low smoke generation during melt processing, without adversely affecting other properties of the polymer.

BACKGROUND OF THE INVENTION

Many woven and nonwoven webs and fabrics are formed from thermoplastic polymers, such as polypropylene and polyethylene. For instance, spunbond webs, which are used to make diapers, disposable garments, personal care articles, and the like, are made by spinning a polymeric resin into filaments and then thermally bonding the filaments together. More particularly, the polymeric resin is typically first heated to at least its softening temperature and then extruded through a spinnerette to form filaments, which can then be subsequently fed through a fiber draw unit. From the fiber draw unit, the filaments are spread onto a foraminous surface where they are formed into a web of material.

Besides spunbond webs, other fabrics made from polymers include meltblown fabrics. Meltblown fabrics are made by extruding a molten polymeric material through a die to form filaments. As the filaments exit the die, a high pressure fluid, such as heated air or steam, attenuates and breaks the filaments into discontinuous fibers of small diameter. The fibers are randomly deposited onto a foraminous surface to form a web.

During the formation of many polymeric products, such as spunbond webs and meltblown webs, the polymers used to make the products are exposed to various harsh conditions which can adversely affect the properties of the polymers. For instance, during extrusion, a polymer is not only subjected to various external forces, but is also heated to high temperatures. Due to these conditions, the polymers can decrease in strength and elasticity, can become brittle, can yellow or otherwise degrade in color, or can produce an article with a short product life.

Another problem typically encountered when heating and processing polymers as described above is for the polymers to generate smoke. The production of smoke can possibly foul up the equipment, which reduces efficiency and may discolor the polymer.

In the past, various attempts have been made to improve the performance of polymeric resins that are melt processed to form various articles and products. As used herein, melt processing refers to any process, such as a spunbond process or a meltblown process, whereby a polymer is heated and formed into a particular shape. In the past, in order to improve the performance of polymeric resins, additives such as stabilizers have been added to the polymers. For instance, various stabilizers are commercially available that are designed either to prevent degradation of the polymer when exposed to light, to prevent the polymer from discoloring or yellowing, to prevent the polymer from becoming brittle, or for otherwise preserving the properties of the polymer during use.

Unfortunately, typically when a particular stabilizer is added to the polymer to improve a particular property of the polymer, other properties of the polymer may be adversely affected. As an example, phenols are typically added to polymers in order to increase the thermal stability and the process stability of polymers. Phenols, however, can cause the polymers to yellow and have a shorter product life.

Other problems have also been experienced when attempting to combine different stabilizers into one polymer for enhancing the properties of the polymer. In particular, many stabilizer products are incompatible. For instance, when combined together, stabilizers can render each other ineffective or, instead of improving the performance characteristics of the polymer, can adversely affect the polymer. In fact, since many stabilizers are relatively complex chemical compounds, the results and affects that will occur when different stabilizers are combined is very unpredictable.

One particular problem experienced in the past has been the ability to add to a polymer a stabilizer that will increase the thermal aging stability of the polymer without compromising other properties of the polymer. The thermal aging stability of a polymer refers to the ability of the polymer to resist degradation when exposed to high temperatures for an extended period of time. When exposed to high temperatures, most polymers become brittle and will ultimately lose most of their strength and elasticity.

For polymeric products that are exposed to high temperatures during use, it is important for the polymers to have a substantial amount of thermal aging stability. For instance, woven and nonwoven polymeric fabrics used in the health care industry are typically sterilized prior to use by being placed in a steam oven for a set period of time. For these products, it is important that the polymers do not substantially degrade during the sterilization process.

As stated above, however, in the past, it has been found to be very difficult to increase the thermal aging stability of a polymer without adversely affecting other properties of the polymer. For instance, when stabilizers have been added to polymers for increasing the thermal aging stability, problems have been experienced with yellowing, with the polymer producing smoke during melt processing, and with the ability to maintain the meltflow rating of the polymer within preset limits. Significant problems have also been experienced in attempting to combine a stabilizer that improves the thermal aging stability of the polymer with other stabilizers. Stabilizers used in the past for increasing the thermal aging stability of a polymer have been found to be incompatible with many other additives and stabilizers.

In view of the above deficiencies of the prior art, a need currently exists for a stabilizer or a combination of stabilizers that will significantly improve more than one property of a polymer without any adverse side effects. In particular, it would be very desirable if a stabilizer formulation could be created that provides stability to the polymer during melt processing, that prevents smoke formation during melt processing, and that makes the polymer more thermally stable when exposed to high temperatures for an extended period of time.

SUMMARY OF THE INVENTION

The present invention recognizes and addresses the foregoing disadvantages and others of prior art constructions and methods.

Accordingly, it is an object of the present invention to provide an improved stabilizer formulation for enhancing various properties of polymers during melt processing.

Another object of the present invention is to provide a stabilizer formulation that, when added to a polymer, inhibits the formation of smoke during melt processing.

It is another object of the present invention to provide a stabilizer formulation that, when added to a polymer, improves the thermal aging stability of the polymer.

Still another object of the present invention is to provide a stabilizer formulation that increases the process stability of the polymer.

Another object of the present invention to provide a combination of stabilizers for adding to polymeric materials which inhibit smoke generation during melt processing, improve the thermal aging stability of the polymer, and improve the melt flow stability of the polymer during melt processing, without significantly adversely affecting other properties of the polymer.

It is a further object of the present invention to provide a stabilizer formulation that contains a hindered amine, a blend of phosphites, a hydroxyl amine, and, if desired, an acid scavenger.

These and other objects of the present invention are achieved by providing a process for stabilizing polymers during melt processing. The process includes the step of incorporating into a polymer a stabilizer formulation. The stabilizer formulation includes a hindered amine, at least one hydrolytically resistant phosphite and a hydroxyl amine. The stabilizer formulation inhibits the formation of smoke during melt processing and increases the thermal aging stability of the polymer. Of particular advantage, the above properties of the polymer are improved without significantly adversely affecting any other properties of the polymer.

In one embodiment, the stabilizer formulation also includes a second hydrolytically resistant phosphite that inhibits the meltflow rating of the polymer from increasing during melt processing. If desired, the formulation can further include an acid scavenger for preventing acids contained within the polymer or produced during melt processing from harming the polymer. For instance, the acid scavenger can be calcium lactate, basic magnesium aluminum hydroxide carbonate hydrate, or mixtures of both.

The hindered amine present in the formulation of the present invention can be, in one embodiment, an amine containing a triazine ring. Examples of hindered amines for use in the present invention include 1,3,5-Triazine-2,4,6-triamine,N,N'''[1,2-ethanediylbis[[[4.6-bis[butyl(1,2,2,6,6-pentamethyl-4-piperidinyl)amino]-1,3,5-triazine-2-yl]imino]-3,1-propanediyl]]-bis[N',N''-dibutyl-N',N''-bis(1,2,2,6,6,-pentamethyl-4-piperidinyl)-, Poly[[6-[(1,1,3,3,tetramethyl butyl)amino]-s-triazine-2,4-diyl][[2,2,6,6-t(etramethyl-4-piperidyl)imino]hexamethylene[(2,2,6,6,-tetramethyl-4-piperidyl)imino)]], and mixtures thereof. The hindered amine can be present within the polymer in an amount up to about 0.1% by weight and particularly from about 0.04% to about 0.075% by weight.

The hydroxyl amine included in the formulation of the present invention can, in one embodiment, have the following chemical formula:

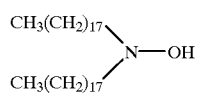

and can be present in a polymer in an amount up to about 0.075% by weight.

Besides a hindered amine and a hydroxyl amine, as stated above, the formulation can further include one or more hydrolytically resistant phosphites. Preferably, the phosphites are organophosphites. For instance, one phosphite that may be incorporated into the polymer for reducing smoke production during melt processing includes:

2-[[2,4,8,10-Tetrakis(1,1-dimethylethyl)dibenzo[d,f][(1,3,2]dioxaphosphepin-6-yl]oxy]-N,N-bis[2-[[2,4,8,10-tetrakis(1,1-dimethylethyl)dibenzo[d,f][1,3,2]dioxaphosphepin-6-yl]oxy]-ethyl]ethanamine A second phosphite that may be incorporated into the formulation of the present invention is Tris(2,4-di-tert-butylphenyl)phosphite. Tris(2,4-di-tert-butylphenyl) phosphite provides the polymer with process stability by inhibiting the meltflow rating of the polymer from increasing during melt processing.

Each of the phosphites may be present within the polymer in an amount up to about 0.075% by weight, and particularly from about 0.03% to about 0.06% by weight.

Other objects, features, and aspects of the present invention will be discussed in greater detail below.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

In general, the present invention is directed to a stabilizer formulation for improving the properties of a polymeric material. In particular, the stabilizer formulation is well suited for use with thermoplastic polymers that are used in melt processing operations. For instance, the stabilizer formulation of the present invention is particularly well suited for incorporation into thermoplastic polymers used to produce woven and nonwoven webs.

When added to a polymer, the stabilizer formulation of the present invention inhibits the polymer from generating smoke during melt processing and substantially increases the thermal aging stability (also known as oven-aging stability) of the polymer. The stabilizer formulation also improves the process stability of the polymer by decreasing the amount the melt flow rate of the polymer increases during melt processing. Further, the formulation can include an acid scavenger for preventing acid formed during melt processing from harming the polymer. Of particular advantage, the stabilizer formulation improves the above properties of the polymer without significantly adversely affecting any of the other properties of the polymer.

In the past, as described above, it has been found to be very difficult to improve more than one property of a polymer through the use of stabilizers without adversely affecting other properties of the polymer. Also, other difficulties have been experienced when combining different stabilizers, due to the effect that different stabilizers may have on one another and due to the effect that a mixture of stabilizers may have upon the polymer. For instance, up until the present invention, the prior art was deficient in providing a stabilizer combination for a polymer that provides process stability, low yellowing, longer thermal aging stability, and low smoke generation during processing.

In general, the stabilizer formulation of the present invention contains in combination a hindered amine, at least one hydrolytically resistant phosphite and a hydroxyl amine. When added to a polymer together, it has been discovered that the hindered amine, the phosphite and the hydroxyl amine inhibit the polymer from smoking during melt processing and significantly increase the thermal aging stability of the polymer. Optionally, the formulation of the present invention can further include a second hydrolytically resistant phosphite for stabilizing the melt flow rate of the polymer during processing and an acid scavenger for preventing any acid being formed during melt processing from degrading the polymer.

Each individual ingredient added to the stabilizer formulation of the present invention will now be discussed in detail with reference to one particular preferred embodiment of the present invention.

The first ingredient present in the formulation is a hindered amine. In the past, hindered amines have been added to polymers as a light stabilizer. With respect to the present invention, the hindered amine is present within the formulation primarily in order to substantially improve the thermal aging properties of the polymer. More particularly, when combined with a polymer, the hindered amine improves the ability of the polymer to withstand higher temperatures for longer periods of time. Of particular advantage, the hindered amine increases the thermal aging stability of the polymer without having a yellowing effect on the polymer, as may occur when using other stabilizers, such as phenols.

In one particular embodiment of the present invention, the hindered amine present within the stabilizer formulation contains a triazine ring. During development of the present invention, it was discovered that hindered amines containing a triazine ring remained effective even when combined with the other stabilizer ingredients. In fact, the present inventors discovered that other amines not containing a triazine ring but which enhance the thermal aging stability of polymers will be rendered ineffective when combined with the other stabilizers contained in the formulation of the present invention.

Two examples of commercially available hindered amines that may be used in the stabilizer formulation of the present invention are CHIMASSORB 119 and CHIMASSORB 944 which are available from the Ciba Speciality Chemicals Corporation, Additives Division located in Tarrytown, N.Y. CHIMASSORB 119 amine and CHIMASSORB 944 amine both contain triazine rings. Besides providing thermal aging stability, CHIMASSORB 119 and CHIMASSORB 944 each also provides the polymer with protection against ultraviolet degradation.

Specifically, CHIMASSORB 119 is a monomeric hindered amine having the following chemical name:

1,3,5-Triazine-2,4,6-triamine,N,N'''-[1,2-ethanediylbis [[[4.6-bis[butyl(1,2,2,6,6-pentamethyl-4-piperidinyl) amino]-1,3,5-triazine-2-yl]imino]-3,1-propanediyl]]- bis[N',N''-dibutyl-N',N''-bis(1,2,2,6,6,-pentamethyl-4-piperidinyl)— and the following chemical structure:

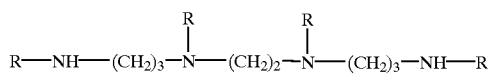

-continued

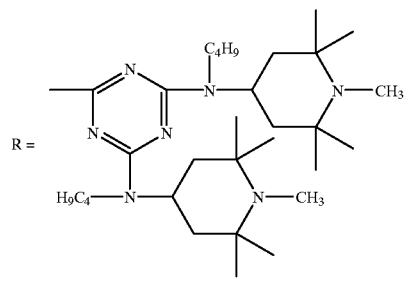

CHIMASSORB 944, on the other hand, has the following chemical name:

Poly[[6-[(1,1,3,3,-tetramethyl butyl)amino]-s-triazine-2, 4-diyl][[(2,2,6,6-tetramethyl-4-piperidyl)imino] hexamethylene[(2,2,6,6,-tetramethyl-4-piperidyl) imino]]

and the following chemical structure:

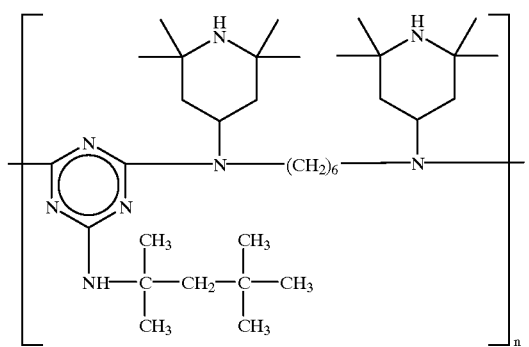

CHIMASSORB 119 and CHIMASSORB 944 can be incorporated into the stabilizer formulation of the present invention either alone or in combination.

In the past, in order to provide thermal aging stability, phenols were typically combined with polymeric resins. Unfortunately, however, phenols can cause polymers to yellow. The stabilizing formulation of the present invention does not require the presence of phenols for increasing the thermal aging stability of the polymer. However, if desired, a phenol can be additionally added to the formulation. For instance, one example of a phenol that may be added to the formulation is IRGANOX 1076, which is commercially available from the Ciba Speciality Chemicals Corporation, Additives Division. IRGANOX 1076 has the following chemical name:

Octadecyl 3-(3',5'-di-tert-butyl-4'-hydroxyphenyl) propanoate

When present in the formulation of the present invention, the phenol can be added to a polymer in a concentration of up to about 1,000 ppm, and particularly from about 500 ppm to about 1,000 ppm.

In general, the amount of hindered amine added to a polymer in accordance with the present invention will generally depend upon the particular polymer being treated and the particular application. For most applications, the hindered amine can be added to a polymer in an amount up to about 0.1% by weight, particularly from about 0.04% to about 0.075% by weight, and in one preferred embodiment in an amount of about 0.05% by weight.

Besides a hindered amine, the stabilizer formulation of the present invention further includes a first hydrolytically resistant phosphite and a hydroxyl amine. The phosphite and the hydroxyl amine both contribute to inhibiting a polymer from generating smoke during melt processing. Of particular advantage, it was discovered by the present inventors that the phosphite and the hydroxyl amine inhibit the formation of smoke without adversely interfering with the ability of the hindered amine to increase the thermal aging stability of the polymer.

In fact, it was unexpectedly discovered that a synergistic effect is produced when the hydroxyl amine is combined with the hindered amine in the stabilizer formulation. For instance, it has been discovered that the hydroxyl amine, besides decreasing the amount of smoke that a polymer produces during melt processing, also tends to stabilize the melt flow rate of the polymer when present with the hindered amine. Although unknown, it is believed that the hindered amine prevents free radicals contained in the stabilizer formulation and in the polymer from reacting with the hydroxyl amine, thus allowing the hydroxyl amine to serve as a process stabilizer.

As stated above, the hydroxyl amine and the first hydrolytically resistant phosphite are primarily added to the formulation of the present invention in order to reduce smoke generated by a polymer during processing. In particular, the formulation of the present invention is capable of reducing smoke production by at least 80%. During development of the present invention, it was discovered that neither the hydroxyl amine or the hydrolytically resistant phosphite alone will reduce smoke by 80%. However, it was discovered that when both stabilizers are combined, smoke production can be decreased by 80%, and even higher if desired.

Hydroxyl amines that may be used in the stabilizer formulation of the present invention generally have the following chemical structure:

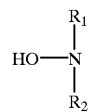

wherein $R_1$ and $R_2$ are, for instance, hydrocarbon chains. One particular commercially available hydroxyl amine well suited for use in the present invention is FS-042 amine marketed by the Ciba Speciality Chemicals Corporation, Additives Division. FS-042 amine has the following chemical structure:

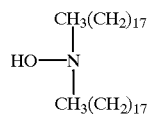

In general, the hydroxyl amine stabilizer can be present within the polymer in an amount generally similar to the amount of hindered amine present in the polymer. For most applications, the hydroxyl amine can be incorporated into the polymer in an amount up to about 0.075% by weight, and, particularly in an amount from about 0.01% to about 0.06% by weight. In one preferred embodiment, the hydroxyl amine is added in an amount of about 0.04% by weight, particularly when the hindered amine is present in the polymer in an amount of about 0.05% by weight.

As described above, the hydroxyl amine works in conjunction with a phosphite in order to lower smoke generation levels of a polymer during melt processing. The phosphite added to the stabilizer formulation should be hydrolytically resistant, meaning that the phosphite will not immediately hydrolyze when exposed to moisture. If the phosphite were not hydrolytically resistant, the phosphite may adversely interfere with the effectiveness of the hindered amine present in the stabilizer formulation.

Hydrolytically resistant phosphites that may be used in the formulation of the present invention include organophosphites, although it was discovered that not all commercially available organophosphites will produce the desired results.

A particular commercially available phosphite that may be used in the formulation of the present invention, for instance, is IRGAFOS 12 available from the Ciba Speciality Chemicals Corporation, Additives Division. IRGAFOS 12 is a organophosphite that has been used in the past as an antioxidant for protecting polymers from thermal breakdown and discoloration. IRGAFOS 12 phosphite has the following chemical name:

2-[[2,4,8,10-Tetrakis(1,1-dimethylethyl)dibenzo[d,f][1,3,2]dioxaphosphepin-6-yl]oxy]-N,N-bis[2-[[2,4,8,10-tetrakis(1,1-dimethylethyl)dibenzo[d,f][1,3,2]dioxaphosphepin-6-yl]oxy]-ethyl]ethanamine and the following chemical structure:

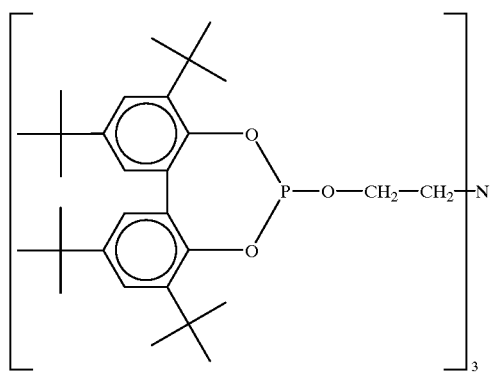

The hydrolytically resistant phosphite used in the present invention for lowering smoke production during melt processing can be added to the polymer generally in amounts similar to the amount of hydroxyl amine present in the polymer. For instance, the phosphite can be added to the polymer in an amount up to about 0.075% by weight, particularly from about 0.03% by weight to about 0.06% by weight, and more particularly in an amount of about 0.04% by weight.

Of particular importance, it has been discovered that the phosphite present in the stabilizer formulation to inhibit smoke production should not be present in the polymer in an amount that is substantially greater than the amount of hindered amine present. When present in greater amounts, the phosphite may have an adverse impact on the ability of the hindered amine to increase the thermal aging stability of the polymer. In particular, it was discovered that the above phosphite began to have an adverse impact upon the hindered amine when present in an amount twice as great as the hindered amine. In this regard, for most applications, the phosphite should be present in the formulation in an amount substantially equal to or less than the amount of hindered amine present.

Besides containing a phosphite for preventing smoke formation, the stabilizer formulation of the present invention can also contain a second phosphite for providing process stability to a polymer. In particular, it has been discovered that a second phosphite can be added to the formulation in order to stabilize the melt flow rating of the polymer during melt processing.

For instance, during melt processing operations, such as when polymeric resins are extruded, the melt flow rating of the polymer can substantially increase. The melt flow rating of a polymer refers to a measure of viscosity of the polymer and is expressed as the weight of material that flows from a capillary of known dimensions under a specified load or shear rate for a predetermined period of time and is measured in g/10 min according to, for example, ASTM test 1238. During most melt processing applications, it is desirable to maintain the melt flow rating of the polymer below a particular level. For instance, in many spunbond processes, the melt flow rating of the polymer is typically around 35 mfr initially and can increase to levels higher than 50 or 60 mfr after extrusion. For most applications, it is desirable to maintain the meltflow rating of the polymer below 50 mfr. Should the melt flow rating of a polymer increase beyond desired levels, the polymer may begin to lose much of its strength and bonding properties.

According to the present invention, by incorporating a second phosphite into the stabilizer formulation, the melt flow rating of a polymer containing the formulation can be maintained below desired levels. In particular, the phosphite can be added to the polymer in an amount sufficient to maintain the melt flow rating of the polymer within predetermined levels.

The second phosphite added to the formulation should be hydrolytically resistant so that the phosphite does not adversely interfere with the hindered amine as described above. One particular example of a hydrolytically resistant phosphite that may be used in the present invention is IRGAFOS 168 which is commercially available from the Ciba Speciality Chemicals Corporation, Additives Division. It has been discovered that IRGAFOS 168 not only provides a polymer with process stability, but also does not adversely interfere with the other stabilizer ingredients contained in the formulation of the present invention. The chemical name of IRGAFOS 168 is Tris(2,4-di-tert-butylphenyl)phosphite, which has the following chemical structure:

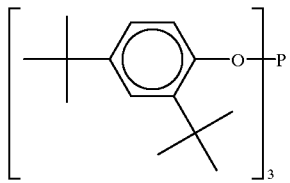

When contained in the stabilizer formulation and added to a polymer according to the present invention, the above described phosphite can be added to a polymer generally in an amount up to about 0.075% by weight, particularly from about 0.03% by weight to about 0.06% by weight, and more particularly in an amount of about 0.04% by weight.

If desired, the stabilizer formulation of the present invention can further contain an acid scavenger. An acid scavenger chemically reacts with any acids present within the polymer or produced during melt processing for preventing the acids from degrading the polymer. For instance, acid catalysts, such as Ziegler-Natta catalysts, are often used to produce polymers. Unfortunately, residual quantities of acidic substances can remain in the polymers. Acid scavengers can reduce or eliminate the corrosivity associated with the presence of the acids.

Examples of acid scavengers that may be used in the present invention include calcium lactate, which is commercially available as PATIONIC 1240 from Patco Polymer Additives Division, American Ingredients Company, Kansas City, Mo., and basic magnesium aluminum hydroxide carbonate hydrate, which is commercially available as DHT-4A from Kyowa Chemical Industry Company, Ltd. located in Osaka, Japan. The amount of acid scavenger added to the polymer will generally depend upon the amount of acid contained within the polymer. For most applications, the acid scavenger can be added to the polymer in an amount up to about 0.1% by weight, particularly from about 0.01% to about 0.05% by weight, and in one embodiment in an amount of about 0.025% by weight.

As described above, the stabilizer formulation of the present invention is particularly well suited for use with thermoplastic polymers that are subjected to melt processing. For instance, the stabilizer formulation can be added to polyolefins, such as polypropylene, polyethylene and random copolymers of polyethylene and polypropylene. In one example, the formulation is added to PLTD 713 experimental polypropylene resin available form the Exxon Corporation, which can be used to form the nonwoven webs. PLTD 713 polypropylene is a controlled rheology polymer. Besides polypropylene, it is believed that the formulation may also be added to ethylene-vinyl acetate, polycarbonates, and polyamides.

The stabilizer formulation can be added to a pure polymeric resin or can be added to a polymeric material containing other substances. For instance, the polymer being stabilized by the formulation can contain fillers, such as clay or calcium carbonate, or can contain other polymers including polyamides, such as nylon, polyesters, or liquid crystal polymers.

Besides fillers and other polymers, the polymeric material being stabilized by the formulation of the present invention can also contain organic softeners. Such softeners can include, for instance, polyethylene wax, polypropylene wax, silicones, etc.

When added to a polymer, the stabilizer formulation can be melt blended with the polymeric resin. In particular, the formulation can be premixed with the resin or can be mixed with the polymeric resin during melt processing, such as prior to being fed or while being fed to an extruder.

In one preferred embodiment of the present invention, the stabilizer formulation, when combined with a polypropylene polymer, contains the following ingredients in the following amounts:

TABLE 1

| Tradename | Chemical | Amount |
|---|---|---|
| CHIMASSORB 119 and/or CHIMASSORB 944 | hindered amine | 500 ppm |
| IRGAFOS 12 | phosphite | 400 ppm |
| FSO42 | hydroxyl amine | 400 ppm |
| IRGAFOS 168 | phosphite | 400 ppm |
| PATIONIC 1240 | calcium lactate | 250 ppm |

The present invention may be better understood with reference to the following examples.

EXAMPLE 1

The following example was performed in order to demonstrate the superiority of a stabilizer formulation made according to the present invention in comparison to stabilizer formulations containing a phenol.

The following stabilizer formulations were prepared and mixed with Exxon PLTD-713 polypropylene resin:

| Sample No. | Stabilizer Formulation |
| --- | --- |
| 1 | 0.10% IRGANOX 1076 + 0.015% DHT4A |
| 2 | 0.10% IRGANOX 1076 + 0.08% IRGAFOS 12 + 0.04% FSO42 + 0.025% PATIONIC 1240 |
| 3 | 0.075% CHIMASSORB 119 + 0.04% IRGAFOS 12 + 0.04% FSO42 + 0.04% IRGAFOS 168 + 0.025% PATIONIC 1240 |

With respect to the above table, IRGANOX 1076 is a phenol, DHT4A is an acid scavenger and contains basic magnesium aluminum hydroxide carbonate hydrate, IRGAFOS 12 is a phosphite, FS042 is a hydroxyl amine, PATIONIC 1240 is an acid scavenger containing calcium lactate, CHIMASSORB 119 is a hindered amine, and IRGAFOS 168 is a phosphite. Sample No. 3 represents a stabilizer formulation made in accordance with the present invention, while sample numbers 1 and 2 represent more conventional formulations containing a phenol. In the past, phenols were added to polymers in order to improve the thermal aging stability and the process stability of the polymer.

Once each of the above stabilizer formulations were added to the polypropylene, the polypropylene was tested for thermal aging stability, melt flow stability, and whiteness.

Thermal aging stability was tested by first extruding the polypropylene into a spunbond fabric. A sample of the fabric was then placed in a forced-air oven set at a temperature of 140° C. The samples were laid flat in a PYREX dish and periodically tested until failure occurred. The failure point for the test was when the fabric became so brittle that the fabric disintegrated when a small force was exerted on the fabric in the cross machine direction.

Once the fabric was formed, the melt flow rate of the polymer was also determined. In particular, a sample of the fabric was heated to a temperature of 245° C. and the melt flow rate was determined according to ASTM procedure D1238. Three repetitions were made for each sample and the results were averaged. The initial meltflow rating of the polypropylene polymer prior to being formed into the fabric was approximately 35 mfr.

After being formed into the fabric, the polymer was also tested for whiteness and yellowing. The yellowing tests were performed by exposing the samples to nitrogen oxides in a United States Testing Company Atmospheric Fume Chamber (Model No.: 8727) according to AATCC test method 23-1972. The samples were exposed for three cycles.

The whiteness of the samples were determined by ASTM method E313-73. The color values were measured on Hunter Color Model D27-9 with standard CIE source C illumination.

The following results were obtained:

TABLE 1

| Sample No. | Thermal Aging Stability in Hours | Fabric MFR 245° C. | Initial Whiteness | Whiteness After 3 Cycles in Gas Fade-Ometer | Decrease in Whiteness |
| --- | --- | --- | --- | --- | --- |
| 1 | 52–76 | 68 | 80.2 | 6.8 | 73.4 |
| 2 | 43–60 | 66 | 87.1 | 8.0 | 79.1 |
| 3 | 216–319 | 66 | 88.0 | 67.5 | 20.5 |

As shown above, the stabilizer formulation made according to the present invention produced much better results when combined with the polypropylene in comparison to the other stabilizer formulations. In particular, the thermal aging stability of the polymer increased over four fold, without significantly adversely affecting the whiteness or the melt flow rating of the polymer. In fact, the polymer containing Sample No. 3 was much more resistant to yellowing than when the polymer contained the other samples. In the past, it was very difficult to increase the thermal aging stability of a polymer without adversely affecting other properties of the polymer.

EXAMPLE NO.2

The following tests were also performed in order to compare the differences between a stabilizer formulation containing a phenol and stabilizer formulations made according to the present invention.

In this example, the following stabilizer formulations were tested. The formulations were added to Exxon-713 polypropylene in the amounts indicated.

TABLE 1

| Sample No. | Stabilizer Formulation |
| --- | --- |
| 1 | 0.10% IRGANOX 1076 + 0.025 PATIONIC 1240 |
| 2 | 0.10% IRGANOX 1076 + 0.04% FS-042 + 0.08% IRGAFOS 12 + 0.025% PATIONIC 1240 |
| 3 | 0.05% CHIMASSORB 119 + 0.04% FS-042 + 0.04% IRGAFOS 12 + 0.04% IRGAFOS 168 + 0.025% PATIONIC 1240 |
| 4 | 0.05% CHIMASSORB 944 + 0.04% FS-042 + 0.04% IRGAFOS 12 + 0.04% IRGAFOS 168 + 0.025% PATIONIC 1240 |

With respect to the above formulations, Sample Nos. 3 and 4 were made according to the present invention while Sample Nos. 1 and 2 represent formulations containing a phenol instead of a hindered amine.

Similar to Example No. 1, after being combined with each of the above formulations, the polymer was formed into a spunbond web and tested for thermal aging stability, and yellowing. The melt flow rating of the polymer was also tested prior to being formed into the fabric. The following results were obtained:

TABLE 2

| Sample No. | Thermal Aging Stability in Hours | Pellet MFR 245° C. | Change in Whiteness After 3 Cycles in gas Fade-Ometer |
| --- | --- | --- | --- |
| 1 | 26 | 44 | 68.6 |
| 2 | 27 | 37 | 70.0 |
| 3 | 165 | 40 | 26.2 |
| 4 | 216 | 39 | 29.2 |

Besides the above results, Sample No. 1 containing a phenol was also compared with Sample No. 4 with respect to smoke generation during extrusion. It was noticed that the polymer containing stabilizer formulation Sample No. 4 produced a dramatically less amount of smoke than the polymer containing Sample No. 1.

As shown above, the polymers containing a stabilizer formulation made according to the present invention had significantly improved properties in comparison to polymers containing the formulations including a phenol. The stabilizer formulations made according to the present invention provided better process stability, lower amounts of yellowing, longer aging and lower smoke generation than the other samples tested.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A process for stabilizing polymers during melt processing, said process comprising the step of incorporating into a polymer a stabilizer formulation, said stabilizer formulation comprising a hindered amine, a hydroxyl amine, a first hydrolytically resistant phosphite for inhibiting smoke formation during melt processing, and a second hydrolytically resistant phosphite that inhibits the melt flow rate of said polymer from increasing during melt processing, said stabilizer formulation increasing the thermal aging stability of the polymer.

2. A process as defined in claim 1, wherein said hindered amine comprises an amine containing a triazine ring.

3. A process as defined in claim 1, wherein said hindered amine comprises an amine selected from the group consisting of 1,3,5-Triazine-2,4,6-triamine,N,N'''-[1,2-ethanediylbis [[[4.6-bis[butyl(1,2,2,6,6-pentamethyl-4-piperidinyl) amino]-1,3,5-triazine-2-yl]imino]-3,1-propanediyl]]-bis[N',N''-dibutyl-N',N''-bis(1,2,2,6,6,-pentamethyl-4-piperidinyl)-, Poly[[6-[(1,1,3,3,-tetramethyl butyl)amino]-s-triazine-2,4-diyl][[(2,2,6,6-tetramethyl-4-piperidyl)imino] hexamethylene[(2,2,6,6,-tetramethyl-4-piperidyl) imino]];

and mixtures thereof.

4. A process as defined in claim 1, wherein said first hydrolytically resistant phosphite and said second hydrolytically resistant phosphite comprise organophosphites.

5. A process for stabilizing polymers during melt processing, said process comprising the step of incorporating into a polymer a stabilizer formulation, said stabilizer formulation comprising a hindered amine, a hydroxyl amine, a first hydrolytically resistant phosphite for inhibiting smoke formation during melt processing, and a second hydrolytically resistant phosphite that inhibits the melt flow rate of said polymer from increasing during melt processing, said stabilizer formulation increasing the thermal aging stability of the polymer and wherein said first hydrolytically resistant phosphite comprises:

2-[[2,4,8,10-Tetrakis(1,1-dimethylethyl)dibenzo[d,f][1,3,2]dioxa-phosphepin-6-yl]oxy]-N,N-bis[2-[[2,4,8,10-tetrakis(1,1-dimethylethyl)dibenzo[d,f][1,3,2] dioxaphosphepin-6-yl]oxy]-ethyl]ethanamine and said second hydrolytically resistant phosphite comprises Tris(2,4-di-tert-butylphenyl)phosphite.

6. A process as defined in claim 1, wherein said stabilizer formulation further comprises an acid scavenger.

7. A process as defined in claim 6, wherein said acid scavenger comprises calcium lactate, basic magnesium aluminum hydroxide carbonate hydrate, or mixtures thereof.

8. A process as defined in claim 1, wherein said hydroxyl amine comprises

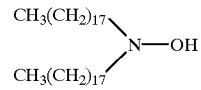

9. A process as defined in claim 1, wherein said stabilizer formulation does not contain any phenolics.

10. A process as defined in claim 1, wherein said polymer comprises polypropylene and wherein said hindered amine is present within said polymer in an amount up to about 0.1% by weight, and said first hydrolytically resistant phosphite, said second hydrolytically resistant phosphite, and said hydroxyl amine are present in said polymer in an amount up to about 0.075% by weight.

11. A process for stabilizing polymers during melt processing, said process comprising the step of incorporating into a thermoplastic polymer a stabilizer formulation, said stabilizer formulation comprising:

a) a hindered amine added to said thermoplastic polymer in an amount sufficient to increase the thermal aging stability of said polymer, said hindered amine comprising an amine containing a triazine ring;

b) a first hydrolytically resistant phosphite and a hydroxyl amine present in said thermoplastic polymer in an amount sufficient to inhibit the formation of smoke during melt processing, said first hydrolytically resistant phosphite being added to said polymer in an amount insufficient to significantly adversely affect said hindered amine; and c) a second hydrolytically resistant phosphite being present within said thermoplastic polymer in an amount sufficient to inhibit the melt flow rating of said polymer from increasing during melt processing.

12. A process as defined in claim 11, wherein said hindered amine is present within said polymer in an amount up to about 0.1% by weight, and said first hydrolytically resistant phosphite, said hydroxyl amine and said second hydrolytically resistant phosphite are each present within said polymer in the amount up to about 0.075% by weight.

13. A process as defined in claim 11, wherein said hindered amine is present within said thermoplastic polymer in an amount from about 0.04% to about 0.075% by weight, and said first hydrolytically resistant phosphite, said hydroxyl amine, and said second hydrolytically resistant phosphite are each present within said polymer in an amount from about 0.03% by weight to about 0.06% by weight.

14. A process as defined in claim 11, wherein said stabilizer formulation further comprises an acid scavenger, said acid scavenger comprising calcium lactate, basic magnesium aluminum hydroxide carbonate hydrate, or mixtures thereof.

15. A process as defined in claim 11, wherein said hindered amine comprises an amine selected from the group consisting of 1,3,5-Triazine-2,4,6-triamine,N,N'''-[1,2-ethanediylbis [[[4.6-bis[butyl(1,2,2,6,6-pentamethyl-4-piperidinyl) amino]-1,3,5-triazine-2-yl],imino]-3,1-propanediyl]]-bis[N',N''-dibutyl-N',N''-bis(1,2,2,6,6,-pentamethyl-4-piperidinyl)-, Poly[[6-[(1,1,3,3,-tetramethyl butyl)amino]-s-triazine-2,4-diyl][[(2,2,6,6-tetramethyl-4-piperidyl)imino] hexamethylene[(2,2,6,6,-tetramethyl-4-piperidyl) imino]], and mixtures thereof.

16. A process as defined in claim 15, wherein said first hydrolytically resistant phosphite comprises 2-[[2,4,8,10-Tetrakis(1,1-dimethylethyl)dibenzo[d,f][1,3,2]dioxaphosphepin-6-yl]oxy]-N,N-bis[2-[[2,4,8,10-tetrakis(1,1-dimethylethyl)dibenzo[d,f][1,3,2]dioxaphosphepin-6-yl]oxy]-ethyl]ethanamine and said second hydrolytically resistant phosphite comprises Tris(2,4-di-tert-butylphenyl)phosphite.

17. A process as defined in claim 16, wherein said thermoplastic polymer comprises polypropylene.

18. A thermoplastic polymer composition adapted to be formed by melt processing into fibers and filaments, said thermoplastic polymer composition comprising:

a polymer blended with a stabilizer formulation, said polymer comprising polypropylene, polyethylene or copolymers thereof, said stabilizer formulation comprising a hindered amine, a hydroxyl amine, a first hydrolytically resistant phosphite for inhibiting smoke formation during melt processing, and a second hydrolytically resistant phosphite that inhibits the melt flow rate of said polymer from increasing during melt processing, said stabilizer formulation increasing the thermal aging stability of said polymer.

19. A polymer composition as defined in claim 18, wherein said hindered amine is present in said composition in an amount up to about 0.1% by weight, and said first hydrolytically resistant phosphite and said hydroxyl amine are each present within said composition in an amount up to about 0.075% by weight.

20. A polymer composition as defined in claim 19, wherein said second hydrolytically resistant phosphite is added to said composition in an amount up to about 0.075% by weight.

21. A polymer composition as defined in claim 20, further comprising an acid scavenger.

22. A polymer composition as defined in claim 21, wherein said acid scavenger comprises calcium lactate.

23. A polymer composition as defined in claim 20, wherein said hindered amine comprises an amine selected from the group consisting of 1,3,5-Triazine-2,4,6-triamine,N,N'''-[1,2-ethanediylbis[[[4.6-bis[butyl(1,2,2,6,6-pentamethyl-4-piperidinyl)amino]-1,3,5-triazine-2-yl]imino]-3,1-propanediyl]]-bis[N',N''-dibutyl-N',N''-bis(1,2,2,6,6,-pentamethyl-4-piperidinyl)-, Poly[[6-[(1,1,3,3,-tetramethyl butyl)amino]-s-triazine-2,4-diyl][[(2,2,6,6-tetramethyl-4-piperidyl)imino]hexamethylene[(2,2,6,6,-tetramethyl-4-piperidyl)imino]]

and mixtures thereof, and wherein said first hydrolytically resistant phosphite comprises 2-[[2,4,8,10-Tetrakis(1,1-dimethylethyl)dibenzo[d,f][1,3,2]dioxaphosphepin-6-yl]oxy]-N,N-bis[2-[[2,4,8,10-tetrakis(1,1-dimethylethyl)dibenzo[d,f][1,3,2]dioxaphosphepin-6-yl]oxy]-ethyl]ethanamine and said second hydrolytically resistant phosphite comprises Tris(2,4-di-tert-butylphenyl)phosphite.

24. A polymer composition as defined in claim 23, wherein said hindered amine is present within said composition in an amount from about 0.04% to about 0.05% by weight, and wherein said first hydrolytically resistant phosphite, said hydroxyl amine and said second hydrolytically resistant phosphite are present within said polymer composition in an amount from about 0.03% to about 0.05% by weight.

25. A process for stabilizing polymers during melt processing, said process comprising the step of incorporating into a polymer a stabilizer formulation, said stabilizer formulation comprising a hindered amine, a hydroxyl amine, and a hydrolytically resistant phosphite for inhibiting smoke formation during melt processing, said stabilizer formulation increasing the thermal aging stability of the polymer and wherein said hydrolytically resistant phosphite comprises:

2-[[2,4,8,10-Tetrakis(1,1-dimethylethyl)dibenzo[d,f][1,3,2]dioxa-phosphepin-6-yl]oxy]-N,N-bis[2-[[2,4,8,10-tetrakis(1,1-dimethylethyl)dibenzo[d,f][1,3,2]dioxaphosphepin-6-yl]oxy]-ethyl]ethanamine.

* * * * *